(12) United States Patent
Wijbrans et al.

(10) Patent No.: US 9,338,179 B2
(45) Date of Patent: May 10, 2016

(54) MESSAGE FLOODING PREVENTION IN MESSAGING NETWORKS

(71) Applicant: MARKPORT LIMITED, Dublin (IE)

(72) Inventors: Klass Wijbrans, Rijen (NL); Jim Plimmer, Sherfield English (GB)

(73) Assignee: MARKPORT LIMITED, Dublin (IE)

( * ) Notice: Subject to any disclaimer, the term of this patent is extended or adjusted under 35 U.S.C. 154(b) by 0 days.

(21) Appl. No.: 14/377,810

(22) PCT Filed: Feb. 20, 2013

(86) PCT No.: PCT/EP2013/053331
§ 371 (c)(1),
(2) Date: Aug. 8, 2014

(87) PCT Pub. No.: WO2013/124291
PCT Pub. Date: Aug. 29, 2013

(65) Prior Publication Data
US 2015/0020196 A1 Jan. 15, 2015

Related U.S. Application Data

(60) Provisional application No. 61/602,200, filed on Feb. 23, 2012.

(51) Int. Cl.
*H04L 29/06* (2006.01)
*H04L 12/58* (2006.01)
(Continued)

(52) U.S. Cl.
CPC ............ *H04L 63/1425* (2013.01); *H04L 51/12* (2013.01); *H04W 4/12* (2013.01); *H04W 12/12* (2013.01); *H04L 12/5895* (2013.01); *H04L 63/1416* (2013.01); *H04W 88/184* (2013.01)

(58) Field of Classification Search
CPC . H04L 51/12; H04L 63/1425; H04L 12/5895; H04L 63/1416; H04W 12/12; H04W 4/12; H04W 88/184; G06F 21/55; G06F 21/565
USPC ............................................... 726/22–25, 13
See application file for complete search history.

(56) References Cited

U.S. PATENT DOCUMENTS 5,280,470 A * 1/1994 Buhrke ............... H04L 12/5602
370/232
7,155,243 B2 12/2006 Baldwin et al.
(Continued)

FOREIGN PATENT DOCUMENTS

EP 1613103 A1 1/2006
GB 2397139 A 7/2004
(Continued)

OTHER PUBLICATIONS

Machine Translation of European Patent Application Publication, EP 1613103 (A1), 2006.*
(Continued)

*Primary Examiner* — Shanto M Abedin
(74) *Attorney, Agent, or Firm* — Ohlandt, Greeley, Ruggiero & Perle, L.L.P.

(57) ABSTRACT

A message flooding prevention system (1) has multiple interceptors (2, 3, 4), each with an interceptor unit linked with an RCS server, and SMSC, or an MMSC. The interceptors (2, 3, 4) are connected to flood detect nodes (10) for receiving messages at a point in a communications network, extracting data from a message, generating at least one code from extracted data, and comparing the code or codes with one or more previous codes. The flood detect nodes (10) determine according to the comparison if the received message is suspected to be a flooding message and if so, performs code generation including hashing. The flood detect nodes (10) save the code to one of a set of database buckets (21), each bucket being associated with a code, and select a bucket according to the generated code, and increment a fill parameter of the selected bucket.

16 Claims, 8 Drawing Sheets

(51) Int. Cl.
*H04W 4/12* (2009.01)
*H04W 12/12* (2009.01)
*H04W 88/18* (2009.01)

(56) References Cited

U.S. PATENT DOCUMENTS

| | | | | |
|---|---|---|---|---|
| 7,331,060 | B1* | 2/2008 | Ricciulli | H04L 63/1458 709/227 |
| 8,201,252 | B2* | 6/2012 | Chuah | H04L 47/10 705/51 |
| 2002/0010917 | A1* | 1/2002 | Srikantan | H04L 29/06 725/1 |
| 2002/0159387 | A1* | 10/2002 | Allison | H04L 12/66 370/229 |
| 2004/0054924 | A1* | 3/2004 | Chuah | H04L 47/10 726/22 |
| 2005/0278620 | A1* | 12/2005 | Baldwin | H04L 51/12 715/201 |
| 2009/0265456 | A1* | 10/2009 | Bouvier | H04L 63/1416 709/224 |
| 2010/0050255 | A1 | 2/2010 | Upadhyay et al. | |
| 2010/0229237 | A1 | 9/2010 | Rusche et al. | |
| 2012/0030293 | A1 | 2/2012 | Bobotek | |

FOREIGN PATENT DOCUMENTS

| | | |
|---|---|---|
| WO | 02/071234 A1 | 9/2002 |
| WO | 2007/135145 A2 | 11/2007 |

OTHER PUBLICATIONS

International Preliminary Report on Patentability of the International Searching Authority; PCT/EP2013/053331; issued on Aug. 26, 2014.
Written Opinion of the International Searching Authority; PCT/EP2013/053331; issued on Aug. 26, 2014.
International Search Report; PCT/EP2013/053331; May 14, 2013.
M.Takesue et al.; "Lightweight Detection of Spamming Botnets"; Securware 2011, The Fifth International Conference on Emerging Security Information, Systems and Technologies; Aug. 21, 2011, pp. 1-6; XP055062062.
W.N. Gansterer et al; "Token Buckets for Outgoing Spam Prevention"; Proceedings of the IASTED International Conference on Communication, Network, and Information Security; Nov. 14-16, 2005; Phoenix, AZ, USA; Acta Press, USA; Jan. 1, 2006; pp. 36-41; XP008160077.

* cited by examiner

MESSAGE FLOODING PREVENTION IN MESSAGING NETWORKS

INTRODUCTION

1. Field of the Invention

The invention relates to prevention of flooding in messaging networks.

2. Prior Art Discussion

One of the threats identified in the GSM Association IR.70 "SMS SS7 Fraud" is flooding, which is defined as "The act of flooding is when a large number of messages are sent to one or more destinations. These messages may be either valid or invalid. The value or parameter used to define flooding is the extraordinary number of messages sent."

Conventional anti-flooding approaches such as described in WO02/071234 keep a relational database or a key-value database table where for each new message received from a specific called party or to a specific calling party a new entry is created to count whether the message to that calling/called party. The problem with this approach is that the table can get very large, especially since the table may contain every subscriber of the specific operator, as well as subscribers of specific other operators, meaning that hundreds of millions of entries can be present in the table, thus making it either a memory bottleneck or a disk I/O bottleneck. In addition, the table needs to be maintained by removing the stale entries. With the large number of entries involved in the table, removing stale entries also may become a CPU performance bottleneck. For example, in a network in which no flooding is taking place, with a flooding detection period of 5 minutes and a total capacity of 30,000 SMS/second, about 9 million new records would be created every five minutes during a busy hour. This is already a problem even with the very limited anti-flooding characteristics of conventional SMS.

This problem is increased if, in addition to the called/calling party, other message characteristics need to be taken into account. As anti-flooding can be implemented on the network level, geographical area level, calling/called party level and the content level (e.g., smart phone viruses sending the same message to the whole address book resulting in a flood of messages from different calling/called parties), the total number of entries can increase greatly. This will especially occur in MMS messaging with its much richer content and the ability to not only have multiple recipients but also to classify these as To, Cc and Bcc, and with RCS(e) and CPM messaging which also have much richer content and where content can be made part of sessions. In MMS messaging and in RCS messaging, up to 10 different characteristics may be needed per message using subsets of content and recipients to calculate these characteristics. At the above message volume, the problem is then increased by a factor of 10.

In addition, the convergence of multiple messaging technologies will make the problem even more difficult: flooding will need to be detected on content fragments because spammers can be expected to use multiple messaging technologies to circumvent any single technology anti-flooding implementation. Therefore, a single implementation able to take care of multiple messaging technologies is needed. With the widening to multiple messaging technologies, it can be expected that the number of fingerprints to be maintained simultaneously will increase even further.

As persistence is in practice needed for the detected flooders (to ensure that these are also blocked after an outage), a database is often used to store all flooding information. This however shifts the problem from being memory bound to being disk I/O-bound.

US2010/0229237 (Rusche et al) describes use of dual use counters for routing loops and spam detection. U.S. Pat. No. 7,155,243 (Tekelec) describes content-based screening of messages. US2010/0050255 (Upadhyay) describes a method for suppressing an SMS-induced denial-of-service attack on a network.

The invention is therefore directed towards providing improved anti-flooding methods and systems. The objectives include more efficiency in use of memory, and/or persistence for detected flooders, and/or reduction in amount of CPU to remove stale entries.

SUMMARY OF THE INVENTION

According to the invention, there is provided a messaging system comprising:
  at least one message interceptor node having a processor and ports adapted to receive messages at a point in a communications network,
  at least one flood detect node, having a processor adapted to:
    extract data from a message,
    generate at least one code from the extracted data and save said code to a database,
    compare the code or codes with one or more previous codes, and
    determine according to the comparison if the received message is suspected to be a flooding message.

In one embodiment, said each of said flood detect nodes is adapted to perform code generation including hashing.

In one embodiment, each of said flood detect nodes is adapted to save the code to one of a set of data buckets, each bucket being associated with a code, and to select a bucket according to the generated code, and to increment a fill parameter of the selected bucket.

In one embodiment, each of said flood detect nodes is adapted to write to each bucket:
  an associated code,
  the fill parameter value,
  a time stamp indicating the last time it was incremented,
  a leak rate indicating the decrease of the fill parameter with time, and
  an identifier of an associated algorithm.

Preferably, there is a fixed number of data buckets. In one embodiment, each bucket has a fixed pre-set mapped memory space. In one embodiment, each of said flood detect nodes is adapted to execute an associated flood-detection algorithm for each bucket.

Preferably, each of said flood detect nodes is adapted to perform the step of saving flood-detection data to persistent memory if there is suspected flooding. In one embodiment, each of said flood detect nodes is adapted to determine suspicion of flooding by executing an algorithm associated with a particular bucket. In one embodiment, each of said flood detect nodes is adapted to select a bucket if its associated code matches a current generated code, and if no match is found to select the least full bucket.

Preferably, the code is generated from extracted data which represents only a subset of the message.

In one embodiment, each of said flood detect nodes is adapted to generate a plurality of codes from data extracted from a single message. In one embodiment, a code is generated from each of a plurality of bit string slices. In one embodiment, a particular slice is used to indicate a memory space portion or bucket to write the code to.

In one embodiment, the system comprises a plurality of distributed filter detect nodes. In one embodiment, each of said flood detect nodes is adapted to communicate with another node to manage a single logical bucket.

In one embodiment, there are a plurality of flood detect nodes and they are together adapted to be compatible with a plurality of messaging technologies and deployment models to perform configurable data extraction, data normalization, and mapping to a single cryptographic fingerprint format, In one embodiment, at least one flood detect node is adapted to perform a first level detection to select a fixed number of buckets, to execute a token-bucket algorithm for each bucket to detect flooding, and to execute an empty/cleanest bucket selection algorithm to select a bucket for updating a count.

In one embodiment, at least one flood detect node is adapted to perform a second level detection only for those buckets whose activity during detection is above a certain threshold.

In one embodiment, the system is adapted to be geographically distributed by assigning flood detect nodes based on a hashing algorithm, thus scaling and centralizing specific code subsets and/or distributing the memory and CPU load over multiple instances.

Preferably, the system is adapted to publish confirmed offending sources for point-of-connect blocking and/or, network connectivity barring.

In one embodiment, there is a plurality of flood detect nodes and they all generate codes of a single type and there is at least one shared memory table for said buckets.

In one embodiment, said flood detect nodes use a specific rule to create the codes, and the threshold parameters can be adapted to specific detection times.

In one embodiment, the flood detect nodes are adapted to combine a low detection threshold on specific content fragments with a high detection threshold for generic traffic originating from specific foreign networks.

In one embodiment, the system comprises a plurality of logical tiers with distributed hardware, in which part of the system is implemented as a cloud service shared across multiple networks, in which the flood database is operated as a common cloud service subscribed to by multiple networks.

In another aspect, the invention provides a message processing method performed by a messaging system comprising at least one message interceptor node having a processor and ports adapted to receive messages at a point in a communications network, and at least one flood detect node, the method comprising the steps of:
  extracting data from a message,
  generating at least one code from the extracted data and saving said code to a database,
  comparing the code or codes with one or more previous codes, and
  determining according to the comparison if the received message is suspected to be a flooding message.

In one embodiment, each of said flood detect nodes performs code generation including hashing.

In one embodiment, each of said flood detect nodes saves the code to one of a set of data buckets, each bucket being associated with a code, and to select a bucket according to the generated code, and to increment a fill parameter of the selected bucket.

In one embodiment, each of said flood detect nodes writes to each bucket:
  an associated code,
  the fill parameter value,
  a time stamp indicating the last time it was incremented,
  a leak rate indicating the decrease of the fill parameter with time, and
  an identifier of an associated algorithm.

In one embodiment, there is a fixed number of data buckets. In one embodiment, each bucket has a fixed pre-set mapped memory space. In one embodiment, each of said flood detect nodes executes an associated flood-detection algorithm for each bucket. In one embodiment, each of said flood detect nodes performs the step of saving flood-detection data to persistent memory if there is suspected flooding.

In one embodiment, each of said flood detect nodes determines suspicion of flooding by executing an algorithm associated with a particular bucket. In one embodiment, each of said flood detect nodes selects a bucket if its associated code matches a current generated code, and if no match is found to select the least full bucket.

In one embodiment, the code is generated from extracted data which represents only a subset of the message.

In one embodiment, each of said flood detect nodes generates a plurality of codes from data extracted from a single message, and in which a code is generated from each of a plurality of bit string slices, and a particular slice is used to indicate a memory space portion or bucket to write the code to. In one embodiment, at least one flood detect node performs a first level detection to select a fixed number of buckets, executes a token-bucket algorithm for each bucket to detect flooding, and executes an empty/cleanest bucket selection algorithm to select a bucket for updating a count.

In one embodiment, at least one flood detect node performs a second level detection only for those buckets whose activity during detection is above a certain threshold.

In one embodiment, the system publishes confirmed offending sources for point-of-connect blocking and/or, network connectivity barring.

In another aspect, the invention provides computer readable medium comprising software code adapted to perform the steps of a method of any embodiment set out above when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
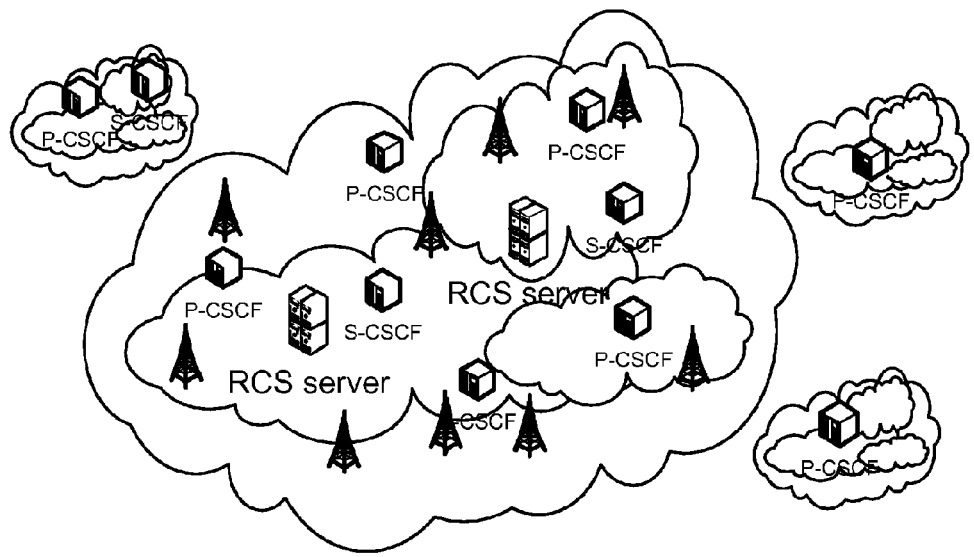
FIGS. 1 and 2 are high level diagrams showing context of the invention.

FIG. 1 shows the context of the invention in the case of an IMS messaging deployment.

It shows that an operator network may consist of any geographical areas (or roaming partners) each with a P-CSCF, a few S-CSCFs and multiple IM servers. The IP messaging traffic is routed through the P-CSCF to the S-CSCF and from the S-CSCF to the RCS server. Inside the network, the operator may have one or more RCS servers that are responsible for the actual IMS messaging. The vast majority of flooding will in practice come from either the interconnect points to the outside world (GW-MSC, connections to other networks, application connections to the internet) or from prepay handsets with a large data/messaging bundle.

Figure 2:
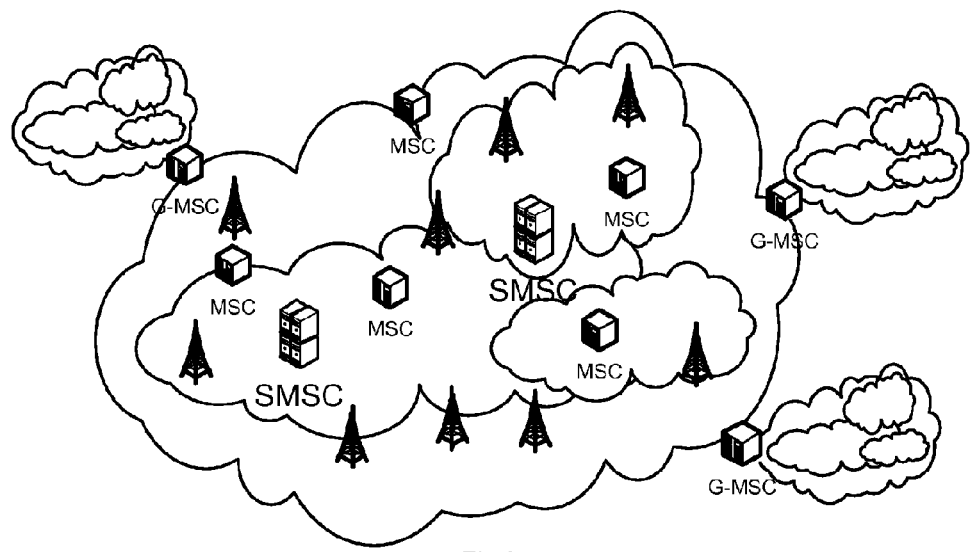

For SMS, FIG. 2 shows the context of an operator network. It shows that an operator network may consist of many geographical areas each with their own base stations (the towers), controlled by MSCs. Inside the operator network an operator may have one or more SMSCs that do the actual SMS messaging.

The operator network connects to other operators via one or more Gateway MSCs (G-MSCs).

In practice, most networks will have both the IMS network with RCS servers and an SMS network with SMSCs and MSCs. The detection of flooding is complicated by both the multiple messaging technologies and the geographical distribution. Flooding may be based on message content (such as virus-infected smart phones all sending the same messages towards the whole address book on the device. Also, flooding may occur simultaneously in multiple messaging technologies (e.g. RCS, MMS, SMS), multiple geographical regions (e.g. MSC-s or P/S-CSCFs), in networks of other operators (coming in via G-MSCs or via their P/S-CSCFs) and may be targeted to different SMSCs, MMSCs and RCS servers. A flooding solution therefore must be able to act in a distributed environment intercepting traffic in multiple network locations for multiple technologies in an efficient manner.

Figure 3:
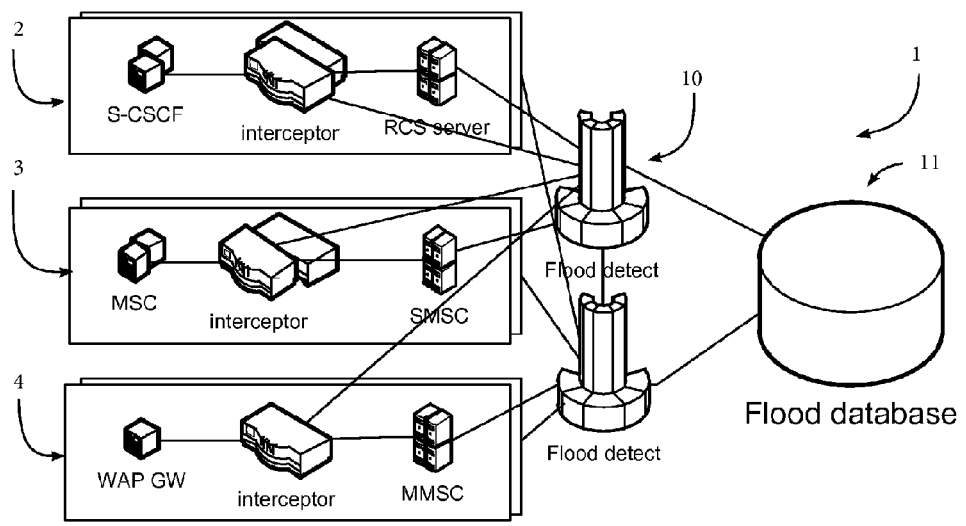
FIG. 3 is a block diagram showing an anti-flooding system of the invention.

FIG. 3 illustrates the invention components across geographically distributed sites when implemented as a separate 'interceptor' add-on to an existing SMSC/MMSC/RCS deployment. As an optimization, the functionality can be integrated into the RCS server/SMSC/MMSC. The 'interceptor' essentially provides detect knowledge with 'late-divert', i.e., only detected likely candidates are forwarded further for smart analysis in the flood detect.

As can be seen from FIG. 3, a flood detection system 1 of the invention consists of a number of main components as follows.

Message interceptors 2, 3, and 4 each having an interceptor unit with an SMSC or MMSC or RCS server. Dependent on the way the invention is implemented (for own subscribers of the operator only or in general), the invention can be implemented as an add-on to a conventional messaging service center as an MMSC/SMSC/RCS-server only detecting flooding in that service center, or in general in the network as a separate device intercepting the SIP signaling traffic, the MO and the MT SS7 signaling traffic and the MMS traffic, detecting flooding and applying blacklisting. There can be multiple interceptors in the network in various locations, for example located with the RSC servers, MMSCs and SMSCs, or for example with the (G-)MSCs, S-CSCFs and WAP gateways/PDN nodes.

Flood detect nodes 10 which are responsible for the first level detection. Each system 10 may consist of multiple nodes partitioning the 'flood detection' data space. Each Message Interceptor 2, 3, and 4 uses a hash calculated on the flood detection parameter to decide which Flood detect node 10 to send an intercepted message to. The flood detect nodes 10 can be used in pairs, where above a certain threshold detect data is exchanged with the peer for redundancy.

Flood database 11. If potential flooding is detected, the occurrence of this potential flooding is stored persistently in the database. If flooding persists, the fingerprint of the flooding is blacklisted and any messages with that fingerprint are blocked. The contents of the database 11 are replicated across all sites to ensure that also in the occurrence of a site failure flooding data is persisted.

The system stores a message occurrence in a bucket. Any flood attack has a "first" message—it's the rate/quantity of the follow on messages that make it flood. The system captures all, but only enforces on excess messaging, using a hierarchical model. First level nodes are optimised to exploit memory for speed, efficiency and effectiveness. The first level nodes trigger suspicious messaging to the second level node. The second level node is the persistent and global view of suspicious and confirmed flood messaging.

Figure 4:
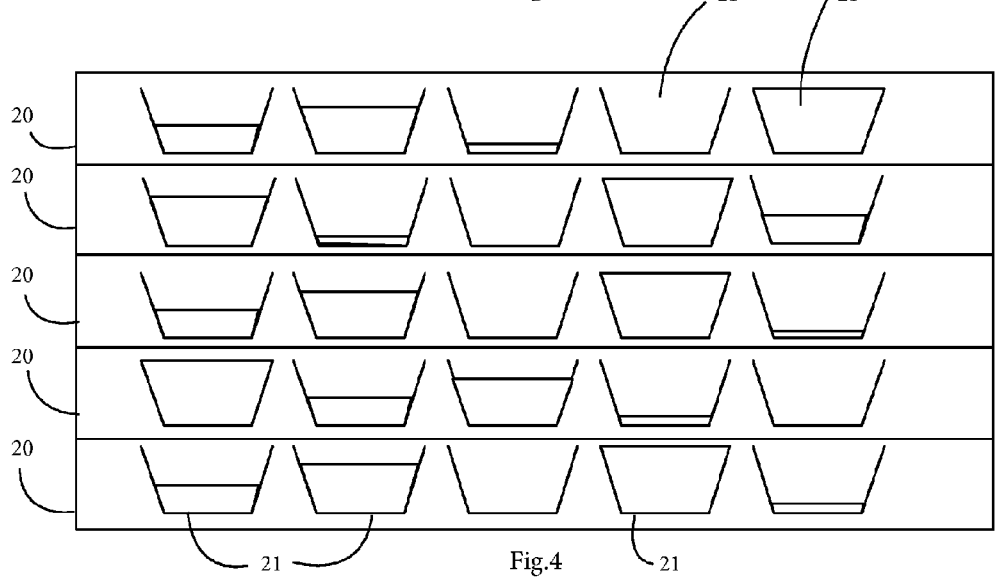
FIG. 4 is a diagram illustrating operation of a detect table of the system.

FIG. 4 illustrates operation of the detect table of the database 11. It consists of a fixed number of rows 20, each with a fixed number of buckets 21. A row 20 is selected by calculating a hash of the flooding fingerprint resulting in a row number. The use of a hash with a uniform mapping of fingerprints to hashes ensures a statistically uniform distribution of flooding data across the table rows 20. By adding a defined search path length (i.e., a configurable fixed number of 'buckets' per key), time-bounded deterministic performance is achieved together with fast matching capabilities and efficient memory usage.

In this specification a "data bucket" means a part of a data record as set out above, or alternatively any memory structure having a capacity with attributes of over-spill and leaking as referred to in data processing terminology. The fill rate is determined by the messages monitored; the threshold determined by the implementation.

Within a table row 20 a fixed number of buckets 21 is maintained. Each bucket 21 contains information on the flooding intensity (using a fixed window counting algorithm, a token bucket algorithm or a leaky bucket algorithm). In addition, the bucket 21 contains the actual fingerprint of the flooding. Because the number of rows 20 and the number of buckets 21 per row is static, the memory consumption is fixed and can be determined in advance, thus resulting in an optimal resource usage. Because a combination of a hash and a small number of fixed buckets 21 is used, access and updates do not require significant CPU resources (significantly lower than any database implementation).

Figure 5:
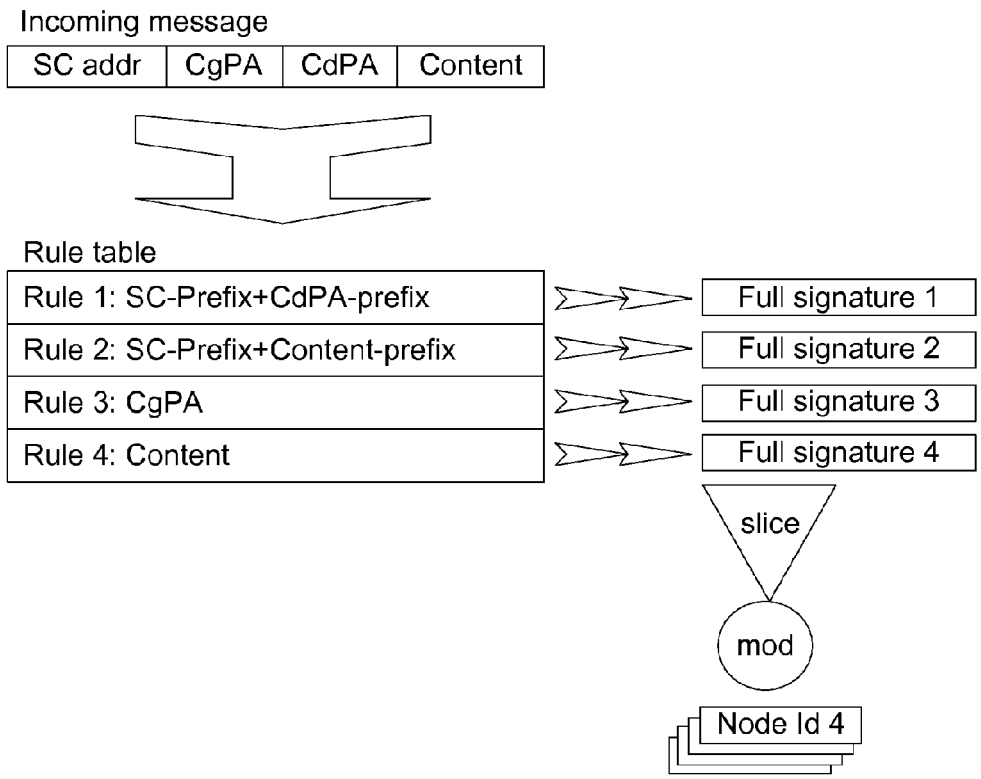
FIG. 5 is a flow diagram illustrating message processing of the system.
Figure 6:
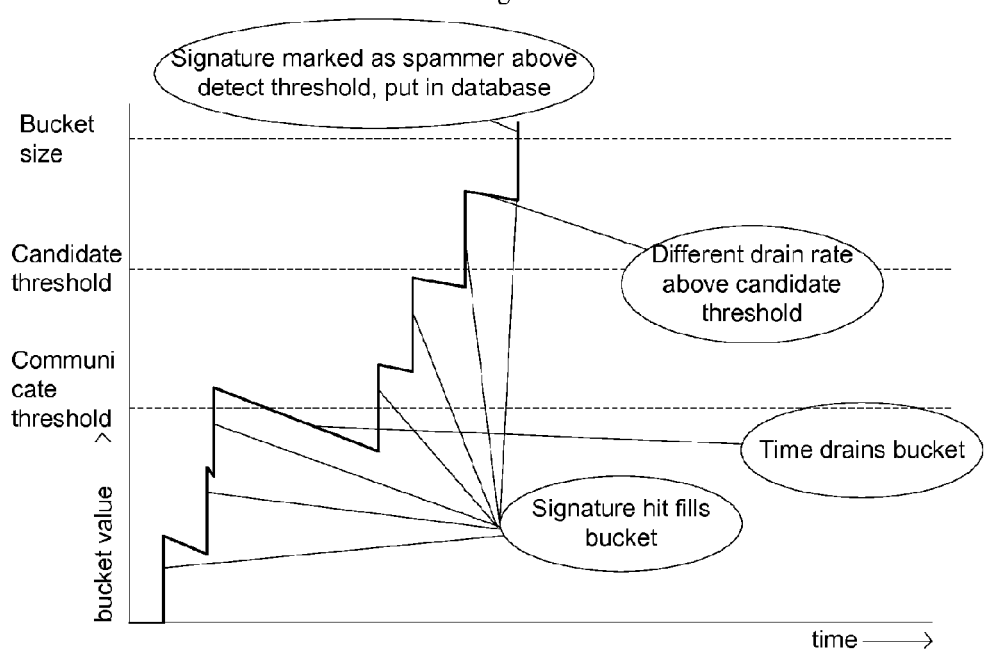
FIGS. 6 and 7 are plots illustrating the processing.
Figure 7:
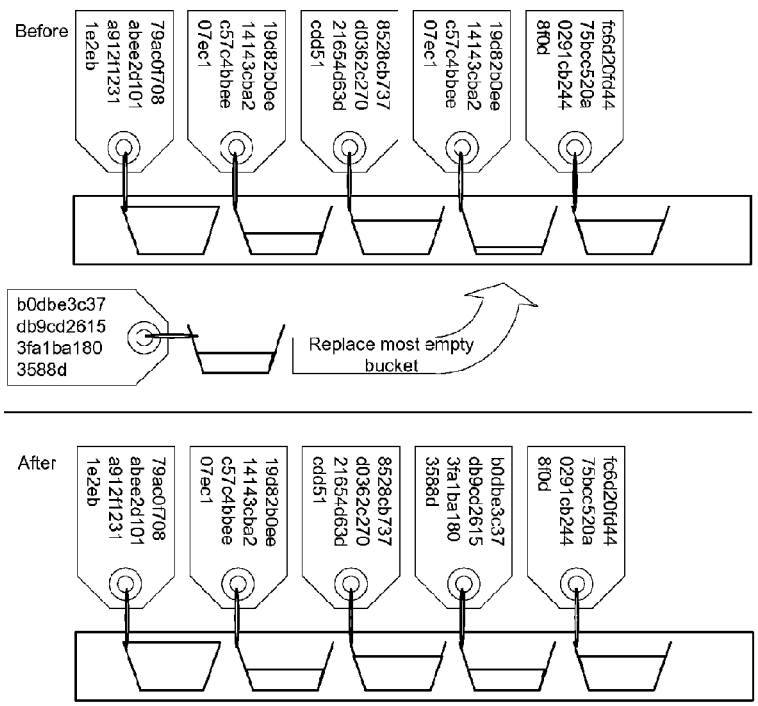

Operation of the system 1 in one embodiment is as follows, with reference to FIGS. 5, 6 and 7.

1. if a message is intercepted from the network by the Message Interceptor 2, 3, or 4, the data in the message is used to calculate a fingerprint for each parameter combination on which flooding needs to be detected. The fingerprint is calculated as a hash fingerprint, for example using the MD5 or the SHA1 or SHA256 algorithm resulting in a bit string that is likely to be unique for that parameter. For the hash algorithm, an algorithm must be used that not only is likely to avoid collisions, but also results in a pseudo-random distribution of hash results even for highly structured input data (e.g., consecutive telephone numbers). Preferably, the fingerprint is a multiple of the machine word length as that allows efficient word-sized comparisons.

2. For each fingerprint a subset of the fingerprint bit string is used to select the flood detection node 10 for that fingerprint. This is done by taking a bit slice of the string and doing a modulo calculation for the number of flood detection nodes. The fingerprint is sent to that specific detection node, optionally with additional information such as the Calling Party and Called Party. For efficiency, the fingerprint is encoded as binary data, preferably as a multiple of 64-bit words (e.g., 128-bit or 256-bit hash key), ensuring highly efficient comparison in modern CPUs.
3. In the flood detect node, another slice of the fingerprint bit string is used to determine the table row in which a bucket will be created/updated for this fingerprint. The substring modulo of the number of configured rows results in the row selection. Due to the pseudo-random distribution of the hash results, buckets will be distributed evenly across the nodes and the rows.
4. The flood detect node 10 now checks the buckets 21 in the row to determine the bucket to update or replace. In doing this, the following algorithm is used:
   a. If the fingerprint is present, the bucket for that fingerprint is updated, e.g., if token bucket is used the bucket is made more empty.
   b. If the bucket 21 increases above or below the threshold, the flood detect node 10 sends the update and the bucket information to the flood detect node 10 on the other site. This flood detect node 10 will update its administration and in turn also return an update if its bucket already was not full, effectively combining the buckets on both sites to a single larger bucket. Because a separate threshold is used for this, inter-site communication only occurs for the more likely flooders and not for every new message arriving at a site.
   c. If the bucket 21 is made completely full by this hit, the flood detect node indicates to the database node that this is a suspect and the bucket is tagged as such. The database node stores this information together with the optional additional information. The optional additional information does not need to be stored in the flood detect node as it is present with every hit on a fingerprint.
   d. if the fingerprint is not present, the most empty bucket 21 is selected (i.e., the bucket that is least likely to flood). In this bucket, the fingerprint is replaced with the new fingerprint and the bucket is filled with the amount for a single message.
5. If the entry is a suspect, the database node 11 is queried to determine whether it is blacklisted. If blacklisted, the flood detect node 10 returns an indication to the interceptor 2, 3, or 4 to blacklist this message. The entry in the flood detect node 10 is marked to indicate that this is a suspect and the parameters are changed accordingly (e.g., block the message, set drain rate to a very low value or to zero so that in subsequent hits it is not necessary to contact the database a).
6. The interceptor 2, 3, or 4 executes the decision of the blacklist.

Figure 8:
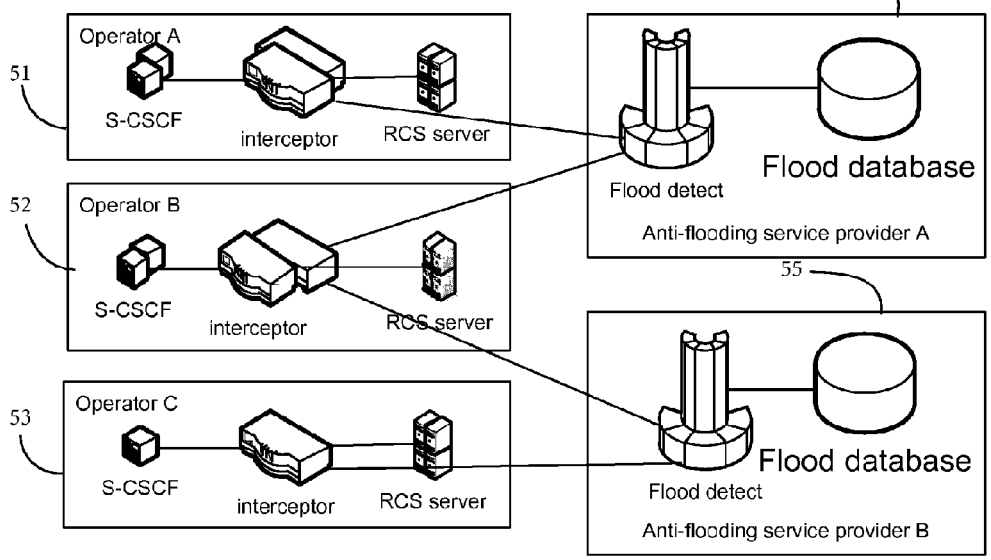
FIG. 8 is a diagram of an alternative system architecture.

Referring to FIG. 8 an alternative system 50 comprises interceptors 51, 52, and 53 for networks A, B, and C respectively. There are two flood detect nodes 54 and 55, each having a dedicated database.

This arrangement has particular advantages for all networks, A, B and C:
   Network A & B directly share flood/traffic level information with '54'
   Network B & C directly share flood/traffic level information with '55'
   Thus '54' can now add value to network B based on traffic information from 'A'
   And '55' can now add value to network B based on traffic information from 'C'
   The flood algorithm and data is separated from the network, increasing efficiency, commonality and enabling new deployment models (like Cloud) to be used It is important to note that through the use of the two-level detection (first in memory, then to database) the amount of activity on the database 11 and the size of the database are reduced significantly: only the actual flooding suspects during the detection period will be propagated to the database, resulting in an 80-90% reduction of the traffic.

In addition, it should be noted that the total memory consumption is significantly less than with a conventional implementation with an in-memory database: because table entries are re-used and because the memory usage is distributed across multiple nodes, no expensive memory additions are needed.

In practice, the memory overhead can be calculated by multiplying the busy hour throughput by the detection period, e.g., if during busy hour 15000 message/second are processed, the minimum detection period is five minutes and there are sixteen different fingerprints per message, 5*16*60*15000 buckets are maximally needed (no flooding going on, each message being inserted in a new bucket). With a proposed 128-bit fingerprint, 1 byte state, 3 byte rule identifier, 32-bit token value and 32-bit timestamp, only 28 bytes per entry are needed, so total memory consumption is 5*16*60*15000*28=4 Gbyte. When distributed over two nodes, this would mean that only 2 Gbyte of memory is used per node, which is small compared to current physical machine memory sizes.

In practice, flooding requires multiple messages (>2), reducing the practical number of fingerprints to be stored even further. In addition, under normal traffic conditions, the detection period is extended automatically.

It is important to note that the use of a hash to detect flooding allows flood detection on not only the actual messages themselves, but also on additional PDUs supporting messaging traffic. Two examples of this are the SIP INVITE, which does not contain the message but it used for messaging session setup and the SMS SRI-FOR-SM which is used to query the location of a handset so that a message can be delivered. The invention for example allows for a fingerprint constructed of the specific PDU type and the source service center, so that mass querying for later delivery of spam messages already can be detected before the actual messages are sent.

SaaS Implementation of Anti-Flooding

In the case of a cloud service implementation, there are three different options for providing additional benefit:
   The flood database 11 is located in the cloud as a service
   The flood detection nodes 10 and the flood database 11 are located in the cloud as a service.
   Additionally, an interceptor 2, 3, or 4 may connect to multiple service providers each providing this service, aiming for different types of detection. This allows the cloud service providers for anti-flooding to specialize, e.g., one provider focusing on content-based detection with knowledge of handset types and payloads, another provider on source address based detection with knowledge on interconnect infrastructure and operator address ranges.
   Finally, instead of being located inside the operator network, the interceptor can be a cloud service as well using an application interface on top of messaging servers. This allows anti-flooding to be provided as a service towards enterprises, where the anti-flooding SaaS sits between multiple operators and enterprises. With the increase in DDoS attacks and the opening of the mobile channel by enterprises, it can be expected that also in this communication leg such measures will be needed to prevent overloading and outages of enterprise systems connected to the mobile network.

This may result in for example the above configuration, where there are two cloud service provider providing anti-flooding in a 'SaaS' implementation (software as a service) and three operators connected to those, for example operator A only using provider A, operator B using provider A and B, and operator C using provider B only.

Figure 9:
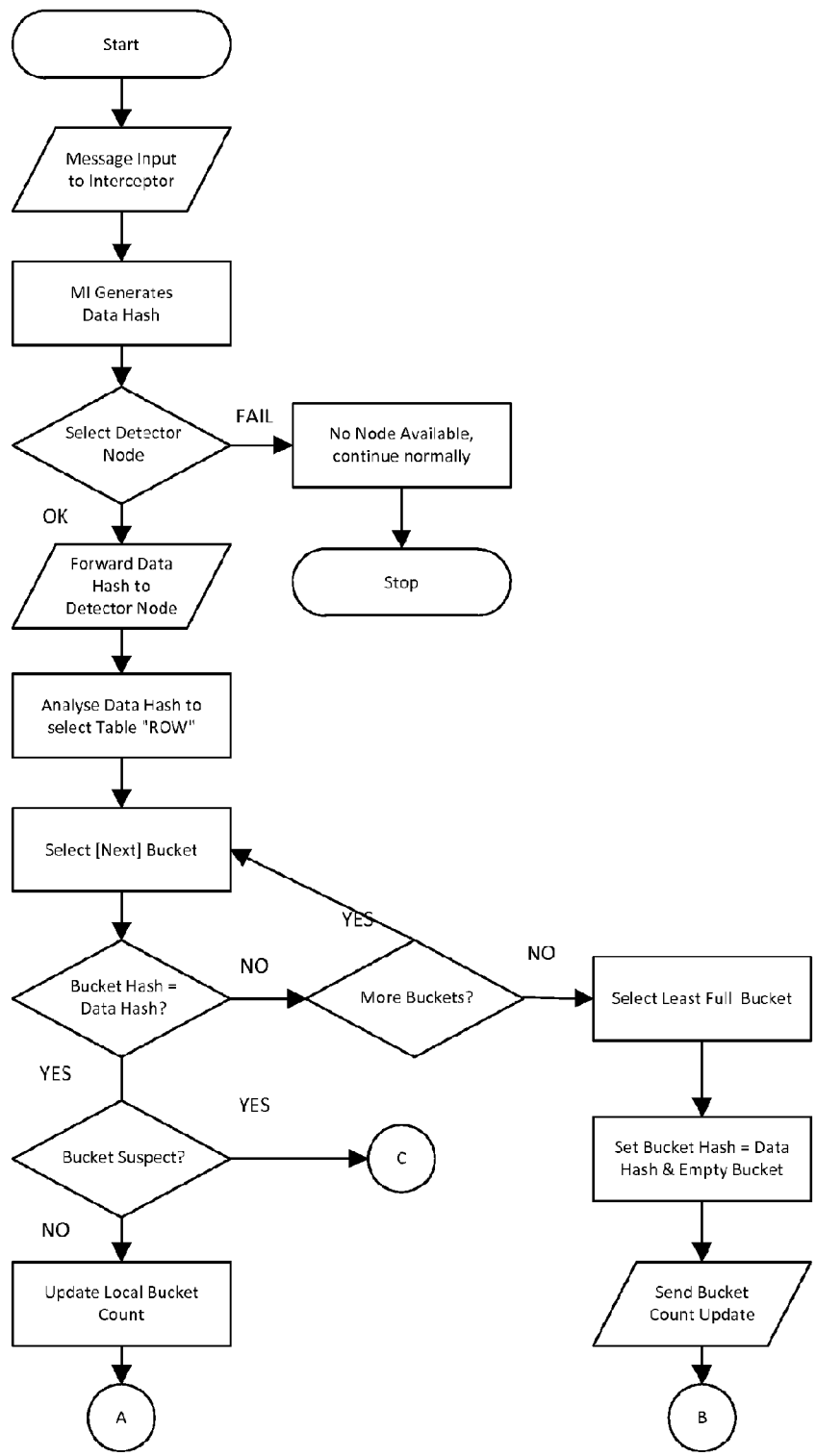
FIG. 9 is a flow diagram of system operation.

Referring to FIGS. 9 to 12, the above flood detection steps are outlined in a main flow of FIG. 9. This illustrates interception, generating a hash, forwarding it to a detector node, analysing it to select a Table ROW. This is followed by selecting the next bucket. If the bucket hash is the same as the current data hash a determination is made as to whether the bucket is suspect. If not, the next bucket is selected in a loop until there are none remaining, at which stage the least full bucket is selected, the hashes are set to be equal, the bucket is emptied, and a count update is uploaded.

Figure 10:
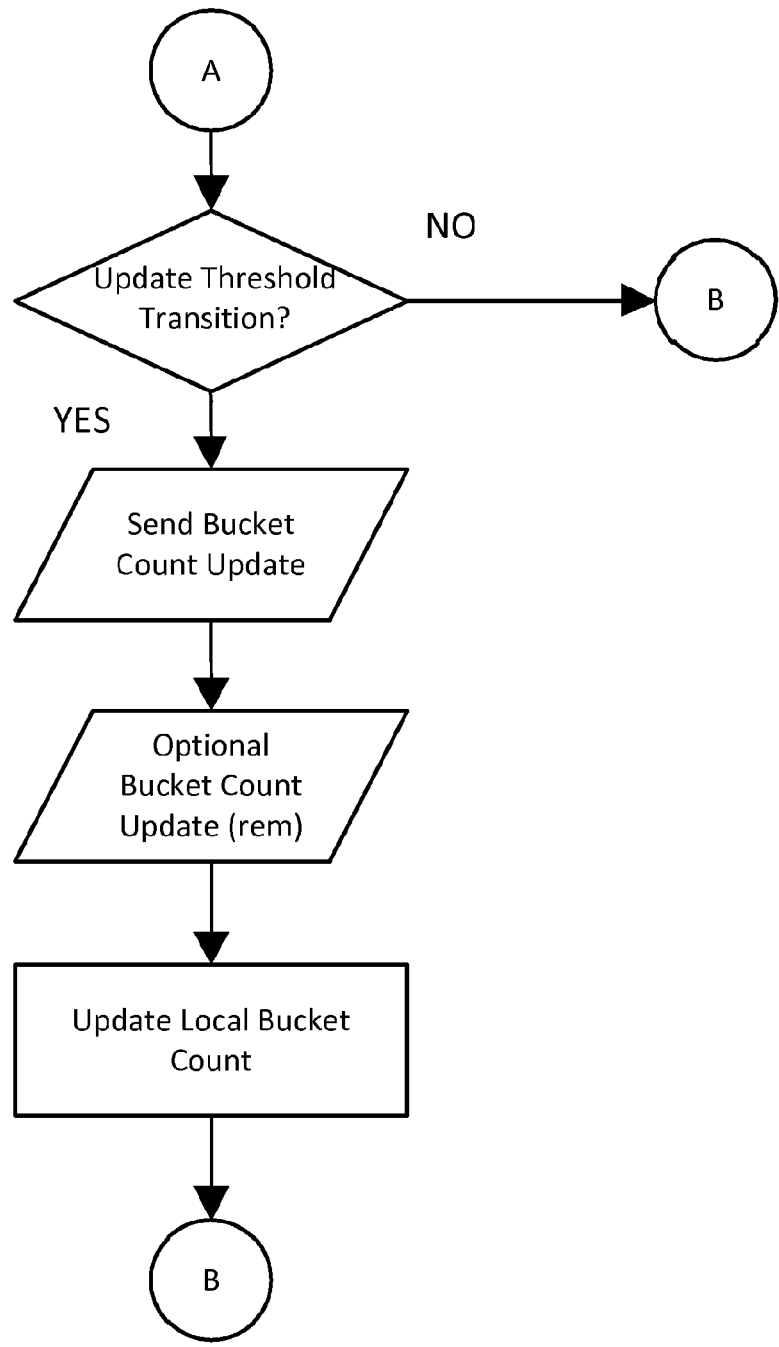
FIGS. 10 to 12 are flow diagrams for branches off the flow of FIG. 9.

FIG. 10 illustrates how sub-routine A is implemented if the current bucket is not suspect. The threshold transition may be updated, the count is uploaded and possibly updated.

Figure 11:
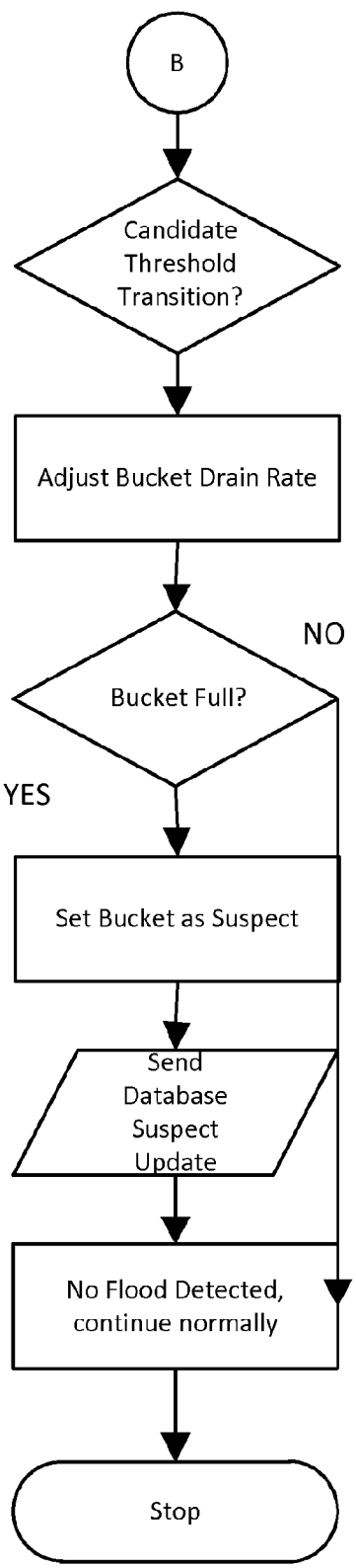
Figure 12:
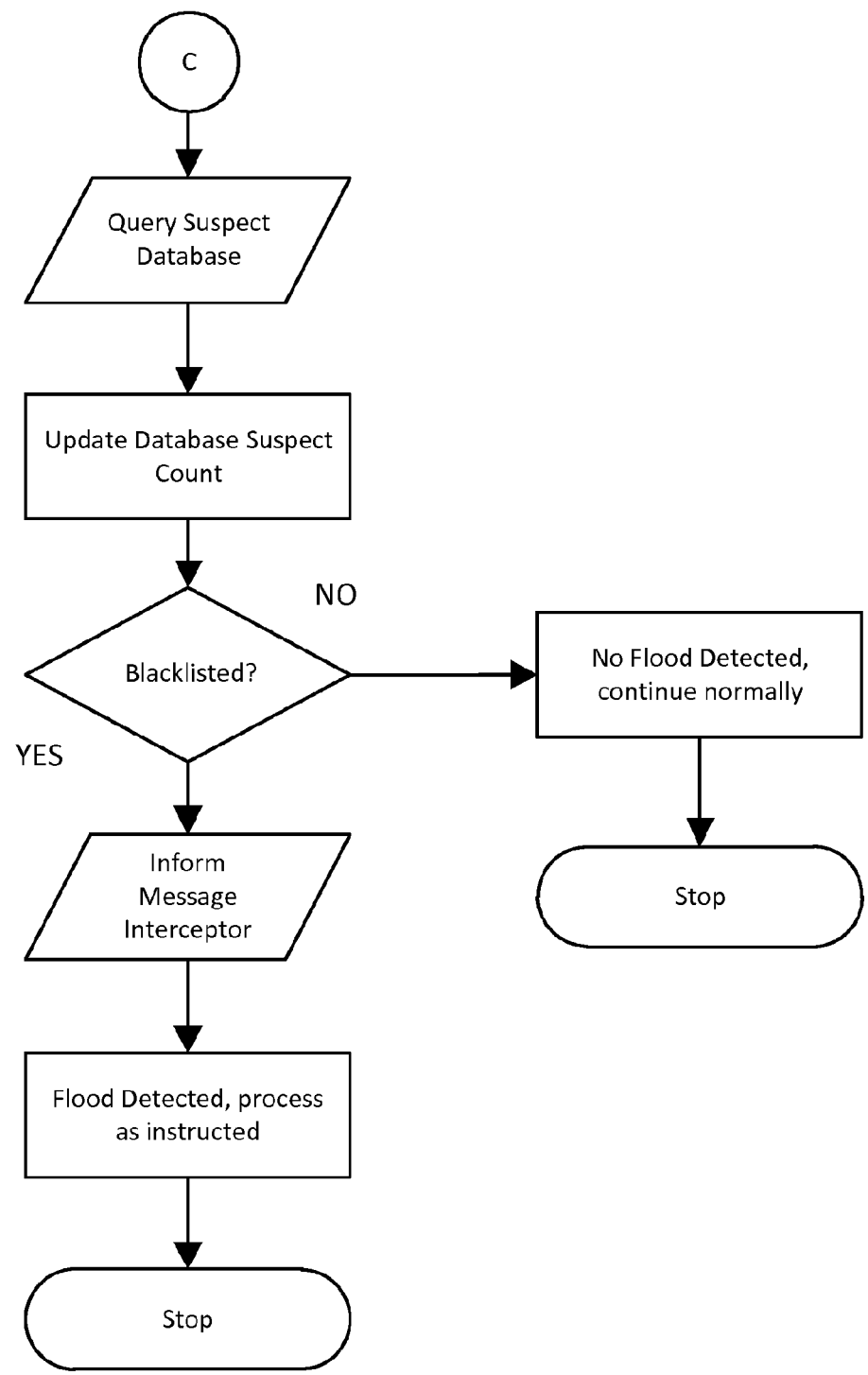

FIG. 11 illustrates the steps after a count upload or threshold transition update. The bucket drain rate is adjusted. If the bucket is full it is flagged as suspect and this flag is uploaded.

It will be appreciated that the invention provides an efficient, scalable anti-flooding system which works across multiple messaging technologies and deployment models (e.g. cloud) using the following techniques:

Configurable data extraction, data normalization and mapping of every different type of spam detection to a single cryptographic fingerprint format, thus preventing the naïve implementation that uses a separate data store with different attributes for each type of spam and flooding detection.

First level detection in a fixed size memory table using a hash function to select a fixed number of buckets, and a token-bucket algorithm inside each bucket to detect flooding, and a empty/cleanest bucket selection algorithm to select the bucket for updating the count.

Second level detection to persistent storage node only for the suspected flooders (i.e., those buckets whose activity during detection is above a certain threshold) using a conventional database allowing for flexible querying of detected flooders.

Geographical distribution by assigning memory table nodes based on a hashing algorithm, thus scaling and centralizing specific fingerprint subsets and/or distributing the memory and CPU load over multiple instances.

Geographical distribution of the persistent storage nodes using hashing.

Geographical redundancy of the persistent storage nodes using replication.

Geographical redundancy of the fixed size memory table by only exchanging updates above a certain bucket threshold value.

Publication of confirmed offending sources for point-of-connect blocking and optionally, network connectivity barring (IMEI function).

By combining these techniques, the following is achieved:

Through the use of configurable data extraction, normalization and then fingerprint calculation, only a single type of fingerprint needs to be stored with limited associated information, thus allowing greater efficiency by maintaining one shared table instead of a separate table per detection algorithm.

Through the use of the fixed-size memory table the 90% non-flooding messages do not fill the database with new records. Instead, there is a fixed number of records for doing detections that is re-used automatically without a need for clean up mechanisms for variable size databases. Instead, the size of the memory used is configurable in advance capping the resources used in the system independent of the various different detections to be done and independent of the actual messaging traffic volume occurring across any specific technology.

The two-level approach in addition allows for an approach where local, inexpensive nodes with a lot of memory take care of the first level detection and only forward those flooders that pass the initial detection level to a more clever node with the database attached for further analysis and blocking.

Through the hashing algorithm, anti-flooding detection capacity can be scaled horizontally by adding multiple nodes. By using a cryptographic hash for the hashing algorithm, the calculation becomes extremely efficient because the SSE extensions take care of the hashing.

By identifying the specific rule used to create the fingerprint, the threshold parameters can be adapted to specific detection times, so for example a low detection threshold on specific content fragments can be combined with a high detection threshold for the generic traffic originating from specific foreign networks.

Through the use of a bucket threshold value, only likely detects and suspects result in inter-site communication, thus decreasing the amount of data exchanged between the sites significantly.

Through the use of the cleanest bucket algorithm graceful behavior under overload is introduced where the most likely flooders are prevented from flooding instead of stopping flooding detection when the table is full.

Because the system consists of multiple tiers, it is possible to create a distributed implementation where part of the service is offered as a cloud service shared across multiple operators. This especially is useful for:

Running the flood database as a common cloud service. The benefit of this is that all operators that subscribe to the common flood database are protected against threats the moments the threat is detected in any one of the connected operators, thus preventing flooding in the other networks.

Running both the flood database and the flood detection as a cloud service, meaning that detection can take place across multiple operators at the same time, so that traffic levels that otherwise would be too low to trigger (a $3^{rd}$ network using spoofing to send spam messages, outbreak of a virus on a specific handset type) still can be detected because the area being looked at has increased.

Where cloud services are used to offer interconnect functionality for service providers, this invention's efficiency in implementation allows value-add services to be offered to the base capability.

The ability to scale the capacity of the flooding implementation for specific traffic peaks, such as known campaigns (e.g., American idols) or known high traffic periods (e.g., Christmas, New Year's Eve, Valentine's Day).

The invention is not limited to the embodiments described but may be varied in construction and detail.

The invention claimed is:

1. A messaging system comprising:
at least one message interceptor node having a processor and ports adapted to receive messages at a point in a communications network, at least one flood detect node, having a processor adapted to:
extract data from a message,
generate at least one code from the extracted data by hashing, and save said code to a database,
compare the code or codes with one or more previous codes, and
determine according to the comparison if the received message is suspected to be a flooding message,
wherein said processor is adapted to perform said comparing and processing steps by:
providing a set of a fixed number of data buckets, each said bucket having an associated code, a fill parameter value, a time stamp indicating the last time it was incremented, a leak rate indicating a decrease in the fill parameter with time, and an identifier of an associated flood detect algorithm,
selecting a bucket according to the generated code,
incrementing a fill parameter of the selected bucket,
determining suspicion of flooding by executing the associated flood detection algorithm, and
saving flood-detection data to persistent memory if there is suspected flooding,
wherein at least one flood detect node is adapted to perform a first level detection to select a fixed number of buckets, to execute said flood detection algorithm for each bucket to detect flooding, and to execute an empty/cleanest bucket selection algorithm to select a bucket for updating a count, and
wherein at least one flood detect node is adapted to perform a second level detection only for those buckets whose activity during detection is above a certain threshold.

2. The messaging system as claimed in claim 1, wherein each bucket has a fixed pre-set mapped memory space.

3. The messaging system as claimed in claim 1, wherein each of said flood detect nodes is adapted to select a bucket if its associated code matches a current generated code, and if no match is found to select the least full bucket.

4. The messaging system as claimed in claim 1, wherein said processor is adapted to generate the code from extracted data which represents only a subset of the message.

5. The messaging system as claimed in claim 1, wherein each of said flood detect nodes is adapted to generate a plurality of codes from data extracted from a single message.

6. The messaging system as claimed in claim 1, wherein a code is generated from each of a plurality of bit string slices.

7. The messaging system as claimed in claim 1, wherein a code is generated from each of a plurality of bit string slices; and wherein a particular slice is used to indicate a memory space portion or bucket to write the code to.

8. The messaging system as claimed in claim 1, wherein the system comprises a plurality of distributed flood detect nodes, wherein each of said flood detect nodes is adapted to communicate with another node to manage a single logical bucket, and wherein said flood detect nodes are adapted to be compatible with a plurality of messaging technologies and deployment models to perform configurable data extraction, data normalization, and mapping to a single cryptographic fingerprint code format, and wherein the system is adapted to be geographically distributed by assigning flood detect nodes based on a hashing algorithm, thus scaling and centralizing specific code subsets and/or distributing the memory and CPU load over multiple instances.

9. The messaging system as claimed in claim 1, wherein at least one flood detect node is adapted to perform a first level detection to select a fixed number of buckets, and to perform a second level detection only for those buckets whose activity during detection is above a certain threshold.

10. The messaging system as claimed in claim 1, wherein the system is adapted to be geographically distributed by assigning flood detect nodes based on a hashing algorithm, thus scaling and centralizing specific code subsets and/or distributing the memory and CPU load over multiple instances.

11. The messaging system as claimed in claim 1, wherein the system is adapted to publish confirmed offending sources for point-of-connect blocking and/or, network connectivity barring.

12. The messaging system as claimed in claim 1, wherein there is a plurality of flood detect nodes and they all generate codes of a single type and there is at least one shared memory table for said buckets.

13. The messaging system as claimed in claim 1, wherein said flood detect nodes use a specific rule to create the codes, and the threshold parameters can be adapted to specific detection times, and wherein the flood detect nodes are adapted to combine a low detection threshold on specific content fragments with a high detection threshold for generic traffic originating from specific foreign networks.

14. A message processing method performed by a messaging system comprising at least one message interceptor node having a processor and ports adapted to receive messages at a point in a communications network, and at least one flood detect node, the method comprising the steps of:
extracting data from a message,
generating at least one code from the extracted data by hashing, and saving said code to a database,
comparing the code or codes with one or more previous codes, and
determining according to the comparison if the received message is suspected to be a flooding message,
wherein said comparing and processing steps include:
providing a set of a fixed number of data buckets, each said bucket having an associated code, a fill parameter value, a time stamp indicating the last time it was incremented, a leak rate indicating a decrease in the fill parameter with time, and an identifier of an associated flood detect algorithm,
selecting a bucket according to the generated code,
incrementing a fill parameter of the selected bucket,
determining suspicion of flooding by executing the associated flood detection algorithm, and
saving flood-detection data to persistent memory if there is suspected flooding,
wherein at least one flood detect node performs a first level detection to select a fixed number of buckets, executes a token-bucket algorithm for each bucket to detect flooding, and executes an empty/cleanest bucket selection algorithm to select a bucket for updating a count, and
wherein at least one flood detect node performs a second level detection only for those buckets whose activity during detection is above a certain threshold.

15. The message processing method as claimed in claim 14, wherein each bucket has a fixed pre-set mapped memory space.

16. A non-transitory computer readable medium comprising software code adapted to perform the following message processing method when executing on a digital processor:
extracting data from a received message,
generating at least one code from the extracted data by hashing, and saving said code to a database,
comparing the code or codes with one or more previous codes, and determining according to the comparison if the received message is suspected to be a flooding message, wherein, said comparing and processing steps include:
   providing a set of a fixed number of data buckets, each said bucket having an associated code, a fill parameter value, a time stamp indicating the last time it was incremented, a leak rate indicating a decrease in the fill parameter with time, and an identifier of an associated flood detect algorithm,
   selecting a bucket according to the generated code,
   incrementing a fill parameter of the selected bucket,
   determining suspicion of flooding by executing the associated flood detection algorithm, and
   saving flood-detection data to persistent memory if there is suspected flooding, wherein at least one flood detect node performs a first level detection to select a fixed number of buckets, executes a token-bucket algorithm for each bucket to detect flooding, and executes an empty/cleanest bucket selection algorithm to select a bucket for updating a count, and wherein at least one flood detect node performs a second level detection only for those buckets whose activity during detection is above a certain threshold.

* * * * *

UNITED STATES PATENT AND TRADEMARK OFFICE
CERTIFICATE OF CORRECTION

PATENT NO.        : 9,338,179 B2
APPLICATION NO.   : 14/377810
DATED             : May 10, 2016
INVENTOR(S)       : Wijbrans et al.

It is certified that error appears in the above-identified patent and that said Letters Patent is hereby corrected as shown below:

On the title page item (72), THE INVENTORS Given Name:
FROM: Klass TO: Klaas

Signed and Sealed this
Twenty-sixth Day of July, 2016

Michelle K. Lee
*Director of the United States Patent and Trademark Office*